United States Patent
Knopik

(10) Patent No.: US 11,515,905 B2
(45) Date of Patent: Nov. 29, 2022

(54) RADIO FREQUENCY (RF) MODULE

(71) Applicant: STMicroelectronics SA, Montrouge (FR)

(72) Inventor: Vincent Knopik, Crets en Belledonne (FR)

(73) Assignee: STMICROELECTRONICS SA, Montrouge (FR)

( * ) Notice: Subject to any disclaimer, the term of this patent is extended or adjusted under 35 U.S.C. 154(b) by 0 days.

(21) Appl. No.: 16/951,709

(22) Filed: Nov. 18, 2020

(65) Prior Publication Data

US 2022/0158685 A1 May 19, 2022

(30) Foreign Application Priority Data

Nov. 13, 2020 (FR) .................................. 2011658

(51) Int. Cl.
*H04B 1/44* (2006.01)
(52) U.S. Cl.
CPC .................................. *H04B 1/44* (2013.01)
(58) Field of Classification Search
CPC ...................................................... H04B 1/44
See application file for complete search history.

(56) References Cited

U.S. PATENT DOCUMENTS

| 7,283,793 B1 * | 10/2007 | McKay ................ H04B 1/0458 333/25 |
| 8,964,605 B1 * | 2/2015 | Ansari ...................... H01P 5/10 370/278 |
| 2012/0129468 A1 | 5/2012 | Maimon et al. |
| 2020/0021024 A1 | 1/2020 | Park et al. |
| 2020/0083924 A1 | 3/2020 | Callender et al. |
| 2020/0287584 A1 * | 9/2020 | Yoo ...................... H04B 1/0064 |
| 2021/0159579 A1 * | 5/2021 | Cumana Morales ..... H01P 5/10 |

* cited by examiner

*Primary Examiner* — Lester G Kincaid
*Assistant Examiner* — Maryam Soltanzadeh
(74) *Attorney, Agent, or Firm* — Slater Matsil, LLP

(57) ABSTRACT

A radio frequency module with common access point (1) comprising a common access point (2) adapted to send and receive radio frequency signals, said common access point (2) having a common access point impedance, a first radio frequency communication circuit (6) and a second radio frequency communication circuit (8), a first balun (10) coupled to the first radio frequency communication circuit (6) by first ports (11a, 11b) wherebetween a first impedance (Z1) varying between a high value and a low value is established, and a second balun (20) coupled to the second radio frequency communication circuit (8) by second ports (21a, 21b) wherebetween a second impedance (Z2) varying between a high value and a low value is established, wherein the radio frequency module with common access point (1) comprises an impedance matching circuit (18) connected between the first ports (11a, 11b) in parallel with the first balun (10), and a switch (16) configured to open and close the impedance matching circuit (18).

21 Claims, 2 Drawing Sheets

RADIO FREQUENCY (RF) MODULE

CROSS-REFERENCE TO RELATED APPLICATIONS

This application claims priority to French Patent Application No. 2011658, filed on Nov. 13, 2020.

TECHNICAL FIELD

The disclosure relates to a radio frequency (RF) module.

BACKGROUND

The presence of at least two radio frequency communication circuits connected to the same access point requires a means of selectively making the common access point cooperate with either one of the radio frequency communication circuits. Conventionally, the common access point is selectively connected to either one of the radio frequency communication circuits by a transistor acting as a switch.

However, the specificities of radio frequency communication require the transistor to be of very high quality in order to limit the noise and interference that it is liable to introduce into the radio frequency signal. The term "radio frequency transistor" is generally used to describe a transistor with the quality level required to perform this function. However, a radio frequency transistor, as a result of the quality levels that it must have, produces a high cost, which generally leads to a compromise between quality and cost that is detrimental overall to the performance levels of the radio frequency module.

Moreover, the connection of a radio frequency communication circuit with common access point requires an impedance matching transformer, or balun-type transformer, to match the impedance of the radio frequency communication circuit to that of the common access point. However, the presence of several baluns can generate electromagnetic disturbances between these baluns, and degrade the performance levels of the radio frequency module.

SUMMARY

Embodiments relate to the field of radio frequency communication by means of an antenna adapted to send and receive radio frequency signals. They further relate to the radio frequency field by the more general means of a common access adapted to send and receive radio frequency signals. In order to procure several operating modes, the common access point must be connected to several radio frequency communication circuits. The most common example is the connection of this access point as an antenna connection or connection with a transceiver circuit, with a radio frequency receiving circuit and a radio frequency transmitting circuit, to allow the same antenna to receive and transmit radio frequency signals. However, the common access point can be connected to two radio frequency receiving circuits or two radio frequency transmitting circuits, for example when looking to adapt the radio frequency communication to radio frequency signals with very different characteristics (frequency, modulation, power, etc.).

Embodiments allow a radio frequency module with common access point to selectively use either one of the radio frequency communication circuits, while ensuring a high performance level without requiring expensive components such as a radio frequency transistor.

For this purpose, the invention proposes a radio frequency module with common access point, comprising a common access point adapted to send and receive radio frequency signals, the common access point having an access point impedance, a first radio frequency communication circuit and a second radio frequency communication circuit, a first balun coupled to the first radio frequency communication circuit by first ports wherebetween a first impedance varying between a high value and a low value is established, and a second balun coupled to the second radio frequency communication circuit by second ports wherebetween a second impedance varying between a high value and a low value is established.

The radio frequency module with common access point comprises an impedance matching circuit connected between the first ports in parallel with the first balun, and a switch configured to open and close the impedance matching circuit. The second radio frequency communication circuit is adapted to be activated or deactivated, the second impedance having a low value when the second radio frequency communication circuit is activated, and a high value when the second radio frequency communication circuit is deactivated. The high value and the low value of the second impedance are greater than the access point impedance.

The radio frequency module with common access point is configured to have two operating modes:

a) a first operating mode wherein the impedance matching circuit is closed by the switch, and the second radio frequency communication circuit taking a low value lower than the high value of the second impedance, and b) a second operating mode wherein the impedance matching circuit is opened by the switch, and the second radio frequency communication circuit is activated, the first impedance taking a high value greater than the access point impedance.

In the first mode, the communication passes through the first radio frequency communication circuit, whereas in the second mode, the communication passes through the second radio frequency communication circuit, although both baluns remain connected to the common access point. The radio frequency module with common access point can thus selectively use either one of the radio frequency communication circuits without the need for a radio frequency transistor.

The radio frequency module with common access point is advantageously supplemented by the following various features, which are taken alone or in any of the different possible combinations:

the first balun and the second balun have impedance transformation ratios through which the low value of the first impedance and the low value of the second impedance are transformed into the value of the access point impedance;

the first radio frequency communication circuit is a radio frequency signal transmitting circuit, and the second radio frequency communication circuit is a radio frequency signal receiving circuit, and wherein the first mode is a radio frequency signal transmitting configuration, and the second mode is a radio frequency signal receiving mode;

the impedance matching circuit comprises at least one winding formed by at least one conductive turn, the winding being in series with the switch between the first ports;

the first balun and the second balun each take the form of two interleaved windings, each formed by at least one conductive turn, a first winding being connected to a radio frequency communication circuit and a second winding being connected to the common access point;

the first balun and the second balun each form a loop in the same plane, the turns being coplanar;

the loop of the first balun and the loop of the second balun are symmetrical with respect to a mid-point;

the first balun and the second balun are connected to the common access point via a common mid-point disposed between the first balun and the second balun, and the respective loops of the first balun and of the second balun are disposed so as to form therebetween an angular sector defined by an angle comprised between 60° and 120°, with the mid-point as the vertex;

a balun comprises an LC circuit, the balun forming a loop and the LC circuit comprising a winding of at least one turn forming two loops within the loop of the balun.

The invention further relates to a method for transmitting and receiving radio frequency signals using a radio frequency module with common access point according to any of the preceding claims, wherein the first radio frequency communication circuit is a radio frequency transmitting circuit, and the second radio frequency communication circuit is a radio frequency receiving circuit, wherein:

a) in a first operating mode, the impedance matching circuit is closed by the switch, and the second radio frequency communication circuit is deactivated, the first impedance taking a low value lower than the high value of the second impedance, and b) in a second operating mode, the impedance matching circuit is opened by the switch, and the second radio frequency communication circuit is activated, the first impedance taking a high value greater than the access point impedance,

BRIEF DESCRIPTION OF THE DRAWINGS

Other features, purposes and advantages of the method will be better understood upon reading the following description, which is provided for illustration purposes only and is not intended to limit the scope of the invention, and which must be read with reference to the accompanying drawings, in which.

DETAILED DESCRIPTION OF ILLUSTRATIVE EMBODIMENTS

Figure 1:
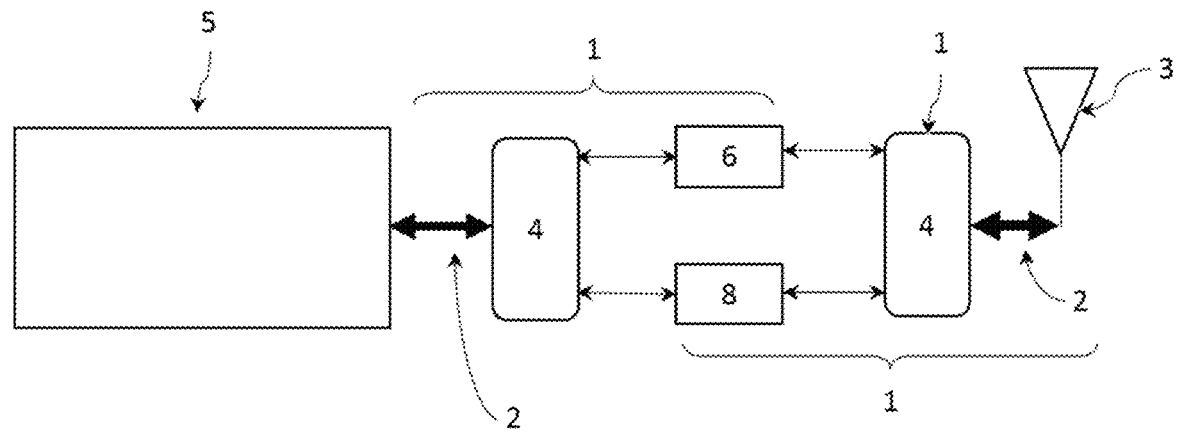
FIG. 1 is a block diagram of an overview of the possible dispositions of a radio frequency module in a radio frequency system.
Figure 2:
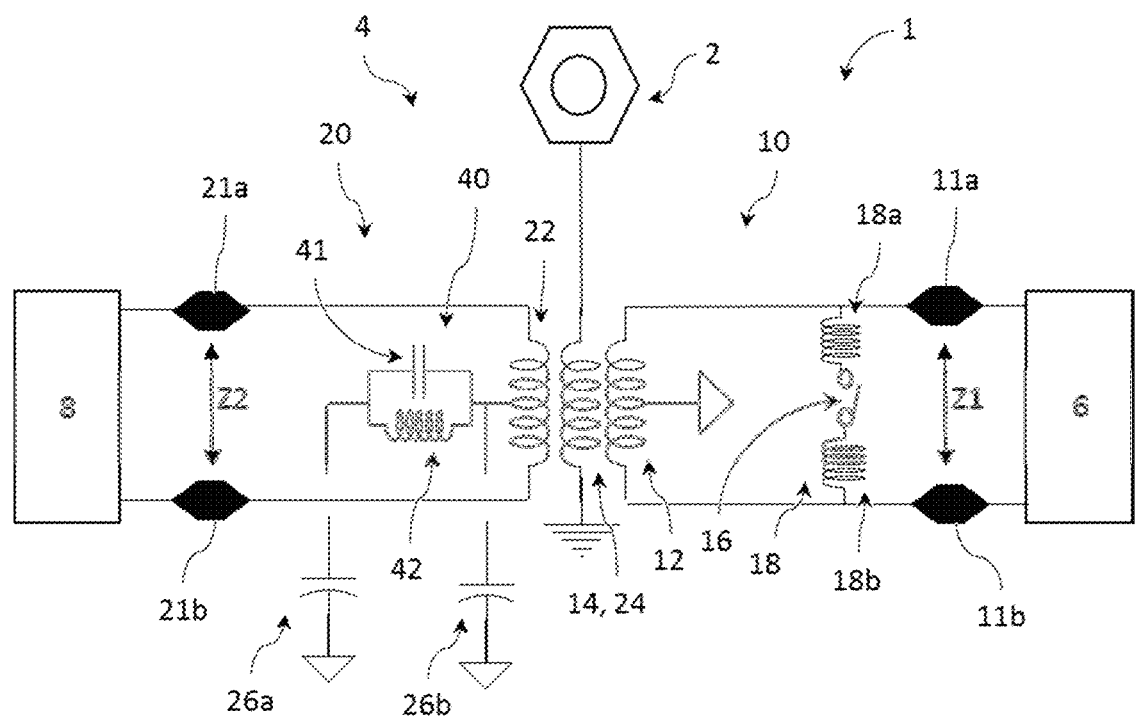
FIG. 2 is a simplified block diagram of the radio frequency module with common access point according to one possible embodiment of the invention.

With reference to FIG. 1, a radio frequency system configured to send and receive radio frequency signals by radio frequency electromagnetic waves comprises an antenna 2 and a transceiver circuit 5, which are connected by intermediate circuits comprising a first radio frequency communication circuit 6 and a second radio frequency communication circuit 8. The transceiver circuit 5 processes the analog radio frequency signals, in particular in terms of demodulation, and in terms of digitization, in order to make them interpretable (for example it converts them into an image, sound, etc.) or, conversely, converts data into analog radio frequency signals. Such a transceiver circuit 5 thus typically comprises at least a digital-to-analog converter and a modulator for transmitting signals, and/or an analog-to-digital converter and a demodulator for receiving signals. Equipping the transceiver circuit to only transmit or receive radio frequency signals can be envisaged.

The first radio frequency communication circuit 6 and the second radio frequency communication circuit 8 essentially comprise amplifiers for the analog radio frequency signals, but can further comprise other components to implement other functions. Thus, in the case of a radio frequency communication circuit dedicated to transmission, such a circuit can comprise a low-noise amplifier, and in the case of a radio frequency communication circuit dedicated to reception, such a circuit can comprise a power amplifier.

Both the first radio frequency communication circuit 6 and the second radio frequency communication circuit 8 must be connected to the transceiver circuit 5, and/or to the antenna 2. For this purpose, a combiner 4 is disposed between the transceiver circuit 5 (respectively the antenna 2) and the two radio frequency communication circuits 6, 8, such that the two radio frequency communication circuits 6, 8 are connected to the same common access point 2 forming an access point to the transceiver circuit 5 (respectively an access point to the antenna 2). The radio frequency module with common access point 1 thus comprises a common access point 2 adapted to send and receive radio frequency signals by radio frequency electromagnetic waves, and a combiner 4 coupled to the common access point 2. The common access point 2 acts as an input/output interface for the radio frequency signals. The access point 2 can be associated with accessory members, such as, for example, a power supply, or safety or filtering devices, which are not shown for simplicity purposes. The common access point 2 has an access point impedance, which is usually standardized and is typically equal to 50 Ω or 75Ω.

In the example shown in FIG. 1, the radio frequency system is provided with two combiners 4, forming radio frequency modules with common access point 1, one coupled to an antenna 3 and the other to a transceiver circuit 5, to show the most comprehensive system. Usually, a single radio frequency module with common access point 1 is coupled either to the transceiver circuit 5, or to the antenna 3.

The radio frequency module with common access point 1 comprises a first radio frequency communication circuit 6 and a second radio frequency communication circuit 8. Although the radio frequency communication circuits 6, 8 can be of several types, for simplicity purposes and for the explanation to be clear, the following description is made in the most common case, i.e. with a radio frequency signal transmitting circuit 6 as the first radio frequency communication circuit, and a radio frequency signal receiving circuit 8 as the second radio frequency communication circuit. However, other configurations can be chosen, for example, two radio frequency signal transmitting circuits can be provided as the first and second radio frequency communication circuits, or two radio frequency signal receiving circuits can be provided as the first and second radio frequency communication circuits. To show this multitude of possibilities, the arrows connecting the radio frequency communication circuits 6, 8 to a combiner 4 are in fact bi-directional in FIG. 1, although the choice of a type of radio frequency communication circuit imposes a direction for the conveyance of the radio frequency signals.

Also for clarity purposes, the common access point is described in the example as the input point of the radio frequency signal transmitting circuit 6 and thus as the output point of the radio frequency signal receiving circuit 8. Within this framework, the common access point 2 can be coupled to a transceiver circuit 5. It goes without saying that the radio frequency module with common access point 1 can also be viewed as the output point of a radio frequency signal receiving circuit and the input point of a radio frequency signal transmitting circuit. In this context, the common access point 2 can be coupled to an antenna, and the radio frequency module with common access point 1 is thus a module with an antenna port.

Since the common access point 2, the radio frequency signal transmitting circuit 8 and the radio frequency signal receiving circuit 6 are conventional and well known to a person skilled in the art, they will not be described in more detail hereinbelow.

The combiner 4 of the radio frequency module with common access point 1 comprises a first balun 10 coupled to the radio frequency signal transmitting circuit 6 by first ports 11a, 11b wherebetween a first impedance Z1 is established. The radio frequency module with common access point 1 further comprises a second balun 20 coupled to the radio frequency signal receiving circuit 8 via second ports 21a, 21b wherebetween a second impedance Z2 is established. A balun is a balanced-to-unbalanced transformer, i.e. a device that transforms a voltage that is balanced to ground into an unbalanced voltage or vice-versa. The term "balun" derives its name from the term "balanced to unbalanced transformer".

The first impedance Z1 and the second impedance Z2 can take different values, which, for simplicity purposes, will be considered here only in terms of the resistance thereof, expressed in Ohms. The values taken by the first impedance Z1 and by the second impedance Z2 depend, on the one hand, on the structure of the radio frequency communication circuits, and in particular on the components of these circuits which are connected to the ports 11a, 11b, 21a, 21b, but also on the state of these radio frequency communication circuits, i.e. whether or not a radio frequency communication circuit is activated, or in other words, whether or not it is powered by a supply voltage. Thus, when the radio frequency signal circuit 8 is activated, for example when it is powered by a Vdc supply voltage, the second impedance Z2 has a low value, for example less than or equal to 100Ω, whereas when the radio frequency signal circuit 8 is deactivated, for example by cutting off the power supply via the Vdc supply voltage (or by grounding it), the second impedance has a high value, for example greater than 200Ω.

When both the radio frequency signal circuit 6 and the radio frequency signal circuit 8 are activated, the value of the second impedance Z2 is greater than the value of the first impedance Z1 due to the structural differences between a radio frequency signal circuit 6 and a radio frequency signal circuit 8. In fact, among two radio frequency communication circuits, the second radio frequency communication circuit is the one that generates an impedance value that is greater than the impedance value of the other radio frequency communication circuit, when both radio frequency communication circuits are in the same activated state. Moreover, it should be noted that the high value and the low value of the second impedance Z2 are greater than the access point impedance.

The combiner 4 of the radio frequency module with common access point 1 comprises a switch 16 configured to open and close an impedance matching circuit 18 connected between the first ports 11a, 11b, in parallel with the first balun 10 and thus in parallel with the radio frequency signal transmitting circuit 6. The impedance matching circuit 18 is configured such that, when closed by the switch 16, it imposes a low value on the first impedance Z1, which is chosen to be the closest to the access point impedance, and for example to be 50Ω. Conversely, when the impedance matching circuit 18 is open, the impedance matching circuit 18 no longer connects the first ports 11a, 11b and thus does not influence the first impedance Z1. The impedance matching circuit 18 can comprise at least one winding 18a, 18b formed by at least one conductive turn, in series with the switch 16. For example, and as shown, the impedance matching circuit can comprise two windings 18a, 18b, each formed by at least one conductive turn. The switch 16 is disposed between these two windings 18a, 18b in order to connect or separate them, the two windings 18a, 18b thus being in series between the first ports 11a, 11b and connected by the switch 16.

The switch 16 is, for example, a transistor, preferably a MOSFET, however it can be of a different type. The switch 16 does not need to have very high performance levels to qualify as a radio frequency transistor. More specifically, the switch 16 is not disposed in series between one of the first ports 11a, 11b and the radio frequency signal transmitting circuit 6, but between the first ports, so that any imperfections of the switch 16 only affect the impedance matching circuit 18. The windings 18a, 18b of the impedance matching circuit 18 further allow any potential disturbances induced by the switch 16 to be rejected. The number of turns in the windings 18a, 18b of the impedance matching circuit 18 can be any number, and is chosen both to smooth the disturbances induced by the switch 16, and to allow a value of the first impedance Z1 to be obtained, between the first two ports 11a, 11b, that is close to that of the access point impedance when the switch 16 is closed. In the example shown, there is a total of two turns in the windings 18a, 18b of the impedance matching circuit 18, but there can be more than two.

Figure 3:
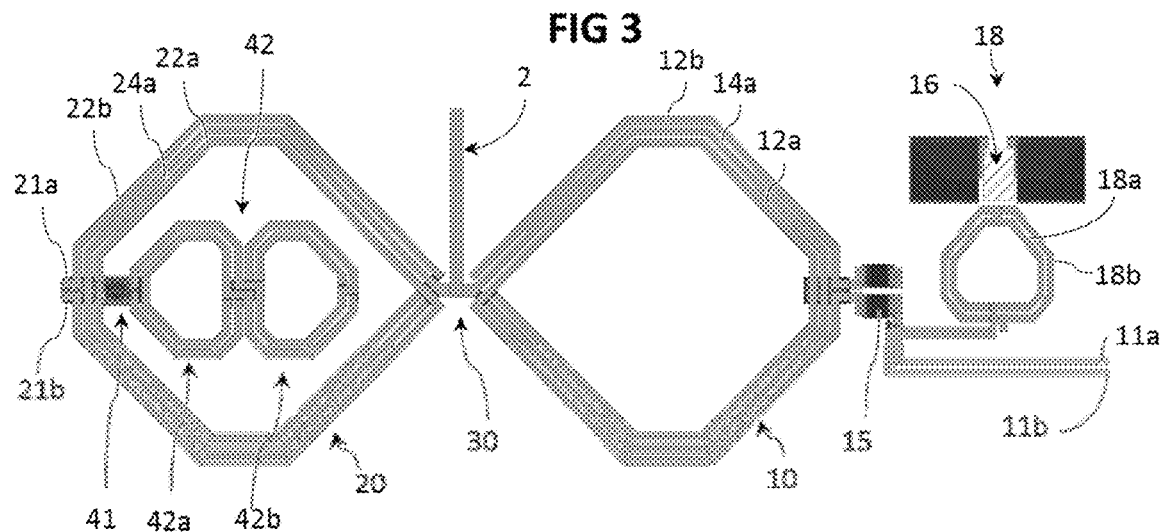
FIG. 3 is a simplified block diagram showing the two baluns and the impedance matching circuit of a radio frequency module with common access point according to one possible embodiment of the invention.
Figure 4:
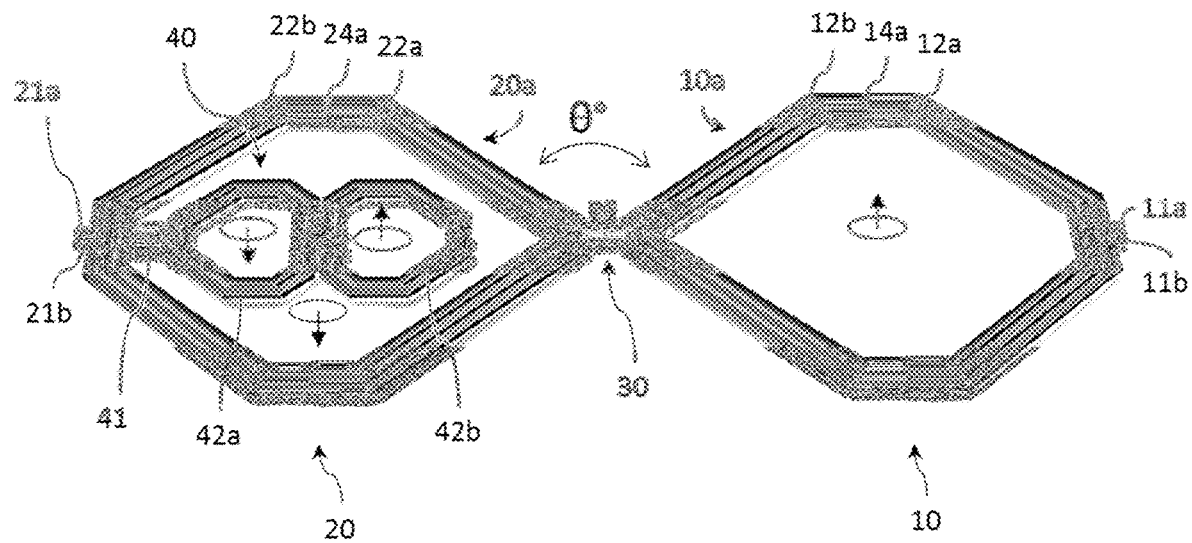
FIG. 4 is a simplified view of the loops of the two baluns highlighting the symmetry thereof and the magnetic complementarity thereof, according to one possible embodiment of the invention.

As shown in FIGS. 3 and 4, the first balun 10 and the second balun 20 each take the form of two interleaved windings, each formed by at least one conductive turn. As in the example shown, the conductive turns can consist of conductive metal tracks disposed on a semiconductor substrate. Other metallized tracks are also present with different levels of metallization, such as the tracks 9 connected to the ground for example. These structures are ancillary, well known to a person skilled in the art, and depend on the embodiments. They will thus not be described in detail hereinbelow.

The first balun 10 comprises a first winding 12, in this case comprising two turns 12a, 12b and a second winding 14 comprising one turn. The first winding 12 is connected to the first ports 11a, 11b, and thus to the radio frequency signal transmitting circuit 6. More specifically, one end of the first winding 12 is connected to one of the first ports 11a, 11b, and the other end of the first winding 12 is connected to the other of the first ports 11a, 11b. The second winding 14, and thus the turn 14a thereof, is connected to the common access point 2. More specifically, the turn 14a of the second winding 14 constitutes a branch of the common access point 2. In this example, the first winding 12 and the second winding 14 comprise a total of three turns 12a, 12b, 14a, and thus carry out an impedance transformation with a transformation ratio of 2:1. The windings 12 and 14 of the first balun 10 can, however, have different numbers of turns, and can thus carry out an impedance transformation with a unit ratio or a different ratio. Moreover, one point of the first winding 12 can be connected to the ground.

The turns 12a, 12b, 14a, are concentric and coplanar, forming a loop. In the radial direction of the loop, the turns 12a, 12b of the first winding 12 alternate with the turns of the second winding 14. From the center of the loop outwards, there is thus firstly a first turn 12a of the first winding 12, then a turn 14a of the second winding 14, and finally a second turn 12b of the first winding 12. Bridges 15 can connect the turns of the same winding.

The second balun 20 has the same loop structure as the first balun 10, with two interleaved windings 22, 24, each formed by at least one conductive turn. The second balun 20 thus comprises a first winding 22, in this case comprising two turns 22a, 22b and a second winding 24 comprising one turn 24a. The first winding 22 is connected to the second ports 21a, 21b, and thus to the radio frequency signal receiving circuit 8. More specifically, one end of the first winding 22 is connected to one of the first ports 21a, 21b, and the other end of the first winding 22 is connected to the other of the first ports 21a, 21b. The second winding 24, and thus the turn 24a thereof, is connected to the common access point 2. More specifically, the turn 24a of the second winding 24 constitutes a branch of the common access point 2. In this example, the first winding 22 and the second winding 24 comprise an unequal number of turns, and thus carry out an impedance transformation with a ratio that is different from unity. In this case, it is a 2:1 transformation ratio, capable of changing a low value of a second impedance Z2 into a value that is compatible with the access point impedance, and for example transforming 100 Ω into 50Ω. Other impedance transformation ratios can be selected by changing the number of respective turns of the windings 22, 24, as in the first balun 10.

The turns 22a, 22b, 24a, are concentric and coplanar, forming a loop. In the radial direction of the loop, the turns 22a, 22b of the first winding 22 are alternated with the turn of the second winding 24. From the center of the loop outwards, there is thus firstly a first turn 22a of the first winding 22, then the turn 24a of the second winding 24, and finally a second turn 22b of the first winding 22.

The transformation ratios of the first balun 10 and of the second balun 20 are chosen such that the transformation of the high values of the first impedance Z1 and of the second impedance Z2 remains substantially higher than the access point impedance, preferably by at least 50%, and more preferably at least twice as high. These transformation ratios are also chosen such that the transformation of the low values of the first impedance Z1 and of the second impedance Z2 results in an impedance of a value that is similar to that of the access point impedance, typically 50Ω, at the common access point 2.

As explained, the first balun 10 and the second balun 20 each form a loop in the same plane, and are thus coplanar. The loop of the first balun 10 and the loop of the second balun 20 close the same surface and preferably have the same shape. More precisely, the loop of the first balun 10 and the loop of the second balun 20 are preferably symmetrical relative to a common mid-point 30, where the branches of the common access point 2 meet. The second winding 14 of the first balun 10 and the second winding 24 of the second balun 20 thus meet at the mid-point 30. By this symmetry, the magnetic coupling between the two loops of the baluns 10, 20 can be cancelled, and the intrinsic magnetic fields of these two loops can also be cancelled.

FIG. 4 shows a simplified view of the spatial organization of the loops of the baluns 10, 20. The loops take on a closed and overall circular shape. In this example, the first balun 10 and the second balun 20 have the same number of turns, in this case 3, showing that this number of turns can be changed. The respective loops of the first balun 10 and of the second balun 20 are disposed so as to form therebetween an angular sector defined by an angle θ comprised between 60° and 120°, and preferably comprised between 75° and 105°, and ideally equal to 90°, with the mid-point 30 as the vertex. The presence of such an angular sector devoid of conductive elements of the first balun 10 and of the second balun 20 ensures electrical isolation therebetween.

Although circular overall, each loop consists of rectilinear segments to simplify manufacture. In the example shown, each loop consists of 7 rectilinear segments. More or fewer rectilinear segments can be used; however the two baluns 10, 20 have the same number of segments. The angular sector is thus defined by the angle θ formed between the opposite segments 10a, 20a of the two baluns 10, 20 which join the mid-point 30. In the absence of such segments, the tangent to the loops of the baluns 10, 20 at the mid-point 30 is taken into account. Preferably, a segment 10a, 20a that joins the mid-point 30 extends as far as one end of the balun 10, 20 (for example upwards or downwards according to the orientation of the figures).

In addition to the symmetries thereof, the loops of the two baluns 10, 20 are configured, by the direction of the connections thereof, in such a way that the currents flowing therethrough generate magnetic fluxes of opposite directions, which cancel each other out. Thus, in FIG. 4, arrows projecting from the center of a circle represent the directions of the magnetic fluxes generated by the baluns 10, 20. The first balun 10 generates a flow directed in a first direction, whereas the second balun 20 generates a flow directed in a second direction, opposite the first direction.

It is possible for a balun such as the second balun 20 to comprise a filter such as an LC circuit 40 to act as a band-pass filter upstream of the radio frequency signal receiving circuit 8. Such an LC circuit 40 comprises a capacitor 41 and a winding 42 mounted in parallel and connected, on the one hand, to a point of the first winding 22 of the second balun 20, and on the other hand to the ground via a first polar capacitor 26a. The common node between the LC circuit 40 and the first winding 22 can also be connected to the ground via a second polar capacitor 26b.

The winding 42 comprises turns forming two loops 42a, 42b, inside the loop of the second balun 20. The two loops 42a, 42b are coplanar with the loop of the second balun 20. The turns are thus disposed such that the magnetic flux generated in one loop 42a is in the opposite direction to the magnetic flux generated in the other loop 42b. For example, the conductive tracks constituting the turns can be disposed in an 8-shape, thus forming the two loops 42a, 42b.

The radio frequency module with common access point 1 operates as follows. The radio frequency module with common access point 1 is configured to have at least two modes: a first mode wherein the first radio frequency communication circuit is used for the radio frequency signals, and a second mode wherein the second radio frequency communication circuit is used for the radio frequency signals. In the example wherein the first radio frequency communication circuit is a radio frequency signal transmitting circuit 6, and the second radio frequency communication circuit is a radio frequency signal receiving circuit 8, the first mode is a common input configuration, with the radio frequency signals flowing from the common access point to the radio frequency signal transmitting circuit 6, through the first balun 10, whereas in the second operating mode for receiving radio frequency signals, the radio frequency signals pass from the radio frequency signal receiving circuit 8 through the second balun 20 to the common access point 2. In the case wherein the common access point is an output point, such as an antenna port for example, the second radio frequency communication circuit 8 is the transmitting circuit and the first radio frequency communication circuit 6 is the receiving circuit. For clarity purposes, only the common access point seen as the input point to the transmitting circuit 6 is described here in detail in the form of a non-limiting example.

In the first mode, in this case in the transmitting mode, the impedance matching circuit 18 is closed by the switch 16. For example, the transistor forming the switch 16 is turned on by means of a bias voltage, thus connecting the two windings 18a, 18b. The first ports 11a, 11b are thus connected by the impedance matching circuit 18, and the first impedance Z1 takes a low value, similar to that of the access point impedance, such as 50Ω. The second radio frequency communication circuit, i.e. the radio frequency signal receiving circuit 8, is deactivated, typically by cutting the power supply with the Vdc voltage (by grounding it). Thus, the second impedance Z2 has a high value, typically greater than or equal to 200Ω. The first impedance Z1 thus takes a low value that is lower than the high value of the second impedance Z2.

In the example, the second balun 20 carries out an impedance transformation with a transformation ratio of less than unity, thus lowering the impedance seen by the common access point compared to the second impedance Z2. However, even with this impedance transformation, the impedance seen by the common access point 2 on the second balun 20 side is greater than that seen by the common access point 2 on the first balun 10 side. Furthermore, as explained hereinabove, the two baluns 10, 20 are electrically isolated and the magnetic fields thereof neutralize one another. Thus, the radio frequency signals supplied by the radio frequency signal transmitting circuit 6 to the first ports 11a, 11b pass through the first balun 10 to reach the common access point 2, without being disturbed by the second balun 20.

In the second mode, in this case in receiving mode, the impedance matching circuit 18 is opened by the switch 16. For example, the transistor forming the switch 16 is turned off by means of a bias voltage, thus disconnecting the two windings 18a, 18b of the impedance matching circuit 18. The first ports 11a, 11b are thus no longer connected by the impedance matching circuit 18, and the first impedance Z1 takes a high value, greater than that of the access point impedance, such as 100 Ω or 150 Ω for example. The second radio frequency communication circuit, i.e. the radio frequency signal receiving circuit 8, is activated, typically by maintaining the power supply with the Vdc voltage. Thus, the second impedance Z2 has a low value, typically less than or equal to 100Ω. The second balun 20 transforms this low value of the second impedance Z2 into a value similar to that of the access point impedance, such as 50 Ω for example.

The first impedance Z1 thus takes a high value that is greater than the transformed low value of the second impedance Z2. Furthermore, as explained hereinabove, the two baluns 10, 20 are electrically isolated and the magnetic fields thereof neutralize one another. Thus, the radio frequency signals received by the common access point 2 pass through the second balun 20 to reach the second ports 21a, 21b and join the radio frequency signal receiving circuit 8, without being disturbed by the first balun 10.

It is thus possible to easily switch from one operating mode to the other, despite the absence of a radio frequency transistor to selectively connect either one of the radio frequency communication circuits.

The invention is not limited to the embodiment described and shown in the accompanying figures. Modifications remain possible, in particular with regard to the constitution of the various technical features or by substituting technical equivalents, without leaving the scope of protection of the invention.

The invention claimed is:

1. A radio frequency module comprising:
   a common access point adapted to send and receive radio frequency signals, the common access point having an access point impedance;
   a first radio frequency communication circuit;
   a second radio frequency communication circuit;
   a first balun coupled to the first radio frequency communication circuit by first ports, a first impedance varying between a first high value and a first low value being established between the first ports;
   a second balun coupled to the second radio frequency communication circuit by second ports, a second impedance varying between a second high value and a second low value being established between the second ports;
   an impedance matching circuit connected between the first ports in parallel with the first balun, the impedance matching circuit comprising a first winding and a second winding, each winding formed by at least one conductive turn, a first terminal of the first winding connected to one of the first ports and a first terminal of the second winding connected to another one of the first ports; and
   a switch configured to open and close the impedance matching circuit, the switch arranged in series between the first winding and the second winding of the impedance matching circuit such that a first terminal of the switch is connected to a second terminal of the first winding and a second terminal of the switch is connected to a second terminal of the second winding.

2. The radio frequency module according to claim 1, wherein the second radio frequency communication circuit is adapted to be activated or deactivated, the second impedance having the second low value when the second radio frequency communication circuit is activated and the second high value when the second radio frequency communication circuit is deactivated, the second high value and the second low value being greater than the access point impedance; and
   wherein the radio frequency module is configured to have two operating modes:
   a first operating mode wherein the impedance matching circuit is closed by the switch and the second radio frequency communication circuit is deactivated, the first impedance taking a low value lower than the second high value; and
   a second operating mode wherein the impedance matching circuit is opened by the switch and the second radio frequency communication circuit is activated, the first impedance taking a high value greater than the access point impedance.

3. The radio frequency module according to claim 2, wherein the first radio frequency communication circuit is a radio frequency signal transmitting circuit and the second radio frequency communication circuit is a radio frequency signal receiving circuit, and wherein the first operating mode is a radio frequency signal transmitting configuration and the second operating mode is a radio frequency signal receiving mode.

4. The radio frequency module according to claim 1, wherein the first balun and the second balun have impedance transformation ratios through which the first low value of the first impedance and the second low value of the second impedance are transformed into the value of the access point impedance.

5. The radio frequency module according to claim 1, wherein the first balun and the second balun each take the form of first and second interleaved windings, each interleaved winding formed by at least one conductive turn, the first interleaved winding being connected to the first or second radio frequency communication circuit and the second interleaved winding being connected to the common access point.

6. The radio frequency module according to claim 5, wherein the first balun and the second balun each form a loop in the same plane and wherein the at least one turn is coplanar.

7. The radio frequency module according to claim 6, wherein the loop of the first balun and the loop of the second balun are symmetrical with respect to a mid-point.

8. The radio frequency module according to claim 1, wherein the first balun and the second balun are connected to the common access point via a common mid-point disposed between the first balun and the second balun, and wherein respective loops of the first balun and of the second balun are disposed so as to form therebetween an angular sector defined by an angle with the common mid-point as the vertex, the angle being between 60° and 120°.

9. The radio frequency module according to claim 1, wherein the second balun comprises an LC circuit, the second balun forming a loop and the LC circuit comprising a winding of at least one turn forming two loops within the loop of the second balun.

10. A method for transmitting and receiving radio frequency signals using a radio frequency module;
wherein the radio frequency module comprises:
a common access point adapted to send and receive the radio frequency signals, the common access point having an access point impedance;
a radio frequency signal transmitting circuit;
a radio frequency signal receiving circuit;
a first balun coupled to the radio frequency signal transmitting circuit by first ports, a first impedance varying between a first high value and a first low value being established between the first ports;
a second balun coupled to the radio frequency signal receiving circuit by second ports, a second impedance varying between a second high value and a second low value being established between the second ports;
an impedance matching circuit connected between the first ports in parallel with the first balun, the impedance matching circuit comprising a first winding and a second winding, each winding formed by at least one conductive turn; and
a switch configured to open and close the impedance matching circuit, the switch arranged in series between the first winding and the second winding of the impedance matching circuit;
and wherein the method comprises:
operating in a radio frequency transmission mode by closing the switch and deactivating the radio frequency signal receiving circuit so that the first impedance takes a low value that is lower than the second high value; and
operating in a radio frequency reception mode by opening the switch and activating the radio frequency signal receiving circuit so that the first impedance takes a high value greater than the access point impedance.

11. The method according to claim 10, wherein the second impedance has the second low value when the radio frequency signal receiving circuit is activated and the second high value when the radio frequency signal receiving circuit is deactivated, the second high value and the second low value being greater than the access point impedance.

12. The method according to claim 10, wherein the first balun and the second balun have impedance transformation ratios through which the first low value of the first impedance and the second low value of the second impedance are transformed into the value of the access point impedance.

13. A radio frequency module comprising:
a common access point adapted to send and receive radio frequency signals, the common access point having an access point impedance;
a radio frequency signal transmitting circuit;
a radio frequency signal receiving circuit;
a first balun coupled to the radio frequency signal transmitting circuit by first ports, a first impedance varying between a first high value and a first low value being established between the first ports;
a second balun coupled to the radio frequency signal receiving circuit by second ports, a second impedance varying between a second high value and a second low value being established between the second ports;
an impedance matching circuit connected between the first ports in parallel with the first balun, the impedance matching circuit comprising a first winding and a second winding, each winding formed by at least one conductive turn, a first terminal of the first winding connected to one of the first ports and a first terminal of the second winding connected to another one of the first ports; and
a switch configured to open and close the impedance matching circuit, the switch arranged in series between the first winding and the second winding of the impedance matching circuit such that a first terminal of the switch is connected to a second terminal of the first winding and a second terminal of the switch is connected to a second terminal of the second winding;
wherein the radio frequency signal receiving circuit is adapted to be activated or deactivated, the second impedance having the second low value when the radio frequency signal receiving circuit is activated and the second high value when the radio frequency signal receiving circuit is deactivated, the second high value and the second low value being greater than the access point impedance; and
wherein the radio frequency module is configured to have two operating modes:
a first operating mode wherein the impedance matching circuit is closed by the switch and the radio frequency signal receiving circuit is deactivated, the first impedance taking a low value lower than the second high value; and
a second operating mode wherein the impedance matching circuit is opened by the switch and the radio frequency signal receiving circuit is activated, the first impedance taking a high value greater than the access point impedance.

14. The radio frequency module according to claim 13, wherein the first balun and the second balun have impedance transformation ratios through which the first low value of the first impedance and the second low value of the second impedance are transformed into the value of the access point impedance.

15. The radio frequency module according to claim 13, wherein the first operating mode is a radio frequency signal transmitting configuration and the second operating mode is a radio frequency signal receiving mode.

16. The radio frequency module according to claim 13, wherein the impedance matching circuit comprises at least one winding formed by at least one conductive turn, the winding being in series with the switch between the first ports.

17. The radio frequency module according to claim 13, wherein the first balun and the second balun each take the form of first and second interleaved windings, each interleaved winding formed by at least one conductive turn, the first interleaved winding being connected to a radio frequency communication circuit and the second interleaved winding being connected to the common access point.

18. The radio frequency module according to claim 17, wherein the first balun and the second balun each form a loop in the same plane and wherein the at least one turn is coplanar.

19. The radio frequency module according to claim 18, wherein the loop of the first balun and the loop of the second balun are symmetrical with respect to a mid-point.

20. The radio frequency module according to claim 13, wherein the first balun and the second balun are connected to the common access point via a common mid-point disposed between the first balun and the second balun, and wherein respective loops of the first balun and of the second balun are disposed so as to form therebetween an angular sector defined by an angle with the common mid-point as the vertex, the angle being between 60° and 120°.

21. The radio frequency module according to claim 13, wherein the second balun comprises an LC circuit, the second balun forming a loop and the LC circuit comprising a winding of at least one turn forming two loops within the loop of the second balun.

* * * * *